United States Patent
Li et al.

(10) Patent No.: US 10,853,092 B2
(45) Date of Patent: *Dec. 1, 2020

(54) METHOD AND DEVICE FOR SOUND EFFECT PROCESSING (71) Applicant: GUANGDONG OPPO MOBILE TELECOMMUNICATIONS CORP., LTD., Guangdong (CN)

(72) Inventors: Yajun Li, Dongguan (CN); Gaoting Gan, Dongguan (CN); Guang Tu, Dongguan (CN); Hai Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,930

(22) Filed: Jun. 3, 2019

(65) Prior Publication Data
US 2019/0354383 A1 Nov. 21, 2019

Related U.S. Application Data (63) Continuation of application No. 16/118,692, filed on Aug. 31, 2018, which is a continuation of application No. PCT/CN2017/088800, filed on Jun. 16, 2017.

(30) Foreign Application Priority Data

Jun. 16, 2016 (CN) .......................... 2016 1 0447279

(51) Int. Cl.
*G06F 9/445* (2018.01)
*G06F 9/4401* (2018.01)
*G06F 9/50* (2006.01)

(52) U.S. Cl.
CPC ........ *G06F 9/44505* (2013.01); *G06F 9/4411* (2013.01); *G06F 9/5027* (2013.01)

(58) Field of Classification Search
CPC . G06F 3/16; G06F 3/162; G06F 3/165; G06F 1/3228; G06F 1/329; G06F 9/46;
(Continued)

(56) References Cited

U.S. PATENT DOCUMENTS 5,628,013 A * 5/1997 Anderson ............. G06F 9/4887
718/107
5,703,794 A * 12/1997 Heddle ................... G06F 3/165
370/267

(Continued)

FOREIGN PATENT DOCUMENTS

CN 1615472 A 5/2005
CN 1987717 A 6/2007
(Continued)

OTHER PUBLICATIONS

International Search Report in the International application No. PCT/CN2017/088800, dated Aug. 30, 2017.
(Continued)

*Primary Examiner* — Andrew C Flanders
(74) *Attorney, Agent, or Firm* — Ladas & Parry LLP (57) ABSTRACT

A method and device for sound effect processing, and a non-transitory storage medium. The method includes the following actions. A task manager is traversed to determine whether a sound effect service process for a sound effect service exists. Responsive to determining that the sound effect service process exists, whether the sound effect service process is a system process of a system, is determined. When the sound effect service process is not a system process of the system, the sound effect service process is set to be a system process of the system.

18 Claims, 6 Drawing Sheets

(58) Field of Classification Search
CPC ...... G06F 9/4806; G06F 9/4843; G06F 9/485;
G06F 9/44505; G06F 9/4411; G06F
9/468; G06F 9/5033; G06F 9/5027; G06F
9/4881; G06F 9/4831
See application file for complete search history.

(56) References Cited

U.S. PATENT DOCUMENTS

| | | | |
|---|---|---|---|
| 6,105,119 A * | 8/2000 | Kerr | G06F 13/4027 710/110 |
| 8,768,494 B1 * | 7/2014 | Stroud | H04S 7/30 700/94 |
| 2002/0107594 A1 * | 8/2002 | Taylor | G06F 9/544 700/94 |
| 2004/0186601 A1 * | 9/2004 | Swenson | G06F 9/485 700/94 |
| 2005/0108718 A1 | 5/2005 | Kumar | |
| 2008/0178180 A1 * | 7/2008 | Sporny | G06F 9/4887 718/102 |
| 2009/0158288 A1 * | 6/2009 | Fulton | G06F 9/4881 718/103 |
| 2009/0312856 A1 * | 12/2009 | Jong | G06F 9/4887 700/94 |
| 2011/0107227 A1 * | 5/2011 | Rempell | H04L 51/046 715/738 |
| 2012/0259440 A1 * | 10/2012 | Zhang | G06F 9/4881 700/94 |
| 2013/0332941 A1 * | 12/2013 | Ramesh | G06F 9/4843 719/314 |
| 2014/0068624 A1 * | 3/2014 | Fuller | G06F 9/5011 718/104 |
| 2015/0043312 A1 | 2/2015 | Wu et al. | |
| 2015/0199971 A1 * | 7/2015 | Wang | G10L 19/16 704/500 |
| 2015/0363155 A1 * | 12/2015 | Hayashi | G10L 13/02 700/94 |
| 2016/0378426 A1 * | 12/2016 | Davis | G06F 3/167 381/77 |
| 2019/0108066 A1 * | 4/2019 | Kim | G06F 9/28 |

FOREIGN PATENT DOCUMENTS

| | | |
|---|---|---|
| CN | 101436146 A | 5/2009 |
| CN | 103530178 A | 1/2014 |
| CN | 103970596 A | 8/2014 |
| CN | 104503828 A | 4/2015 |
| CN | 104978164 A | 10/2015 |
| CN | 105550035 A | 5/2016 |
| CN | 1851651 A | 10/2016 |
| CN | 106095558 A | 11/2016 |

OTHER PUBLICATIONS

English translation of the Written Opinion of the International Search Authority in the international application No. PCT/CN2017/088800, dated Aug. 30, 2017.
Supplementary European Search Report in the European application No. 17812774.2, dated Apr. 15, 2019.
Advisory Action in U.S. Appl. No. 16/118,692, dated May 27, 2020.
Non-Final Office Action in U.S. Appl. No. 16/118,692, dated Jul. 13, 2020.

* cited by examiner

METHOD AND DEVICE FOR SOUND EFFECT PROCESSING

CROSS-REFERENCE TO RELATED APPLICATIONS

This is a continuation application of U.S. application Ser. No. 16/118,692, filed on Aug. 31, 2018, which is a continuation application of International Patent Application No. PCT/CN2017/088800, filed on Jun. 16, 2017, which claims the priority benefit of Chinese Patent Application No. 201610447279.7, filed on Jun. 16, 2016, the contents of which are incorporated by reference herein in their entireties for all purposes.

TECHNICAL FIELD

The disclosure relates to the technical field of terminals, and particularly to a method and terminal for sound effect processing.

BACKGROUND

In recent years, along with development and popularization of terminals (for example, smart phones and tablet computers), a terminal has become an inevitable part in daily life of a user. Since more and more functions are integrated in a terminal, a running environment of the terminal becomes increasingly complicated.

There exists such a scene that an android platform environment is complicated and, when multiple programs concurrently run, a sound effect may be likely to fail, so that a user experience is reduced.

SUMMARY

According to a first aspect, the embodiments of the disclosure disclose a method for sound effect processing, which may include the following operations.

A task manager is traversed to determine whether a sound effect service process for a sound effect service exists.

Responsive to determining that the sound effect service process exists, whether the sound effect service process is a system process of a system is determined.

When the sound effect service process is not a system process of the system, the sound effect service process is set to be a system process of the system.

According to a second aspect, the disclosure discloses a device for sound effect processing, which may include a processor and one or more units. The one or more units includes a traversing unit, a determination unit and a setting unit.

The traversing unit is configured to traverse a task manager to determine whether a sound effect service process for a sound effect service exists.

The determination unit is configured to, responsive to determining that the sound effect service process exists, determine whether the sound effect service process is a system process of a system.

The setting unit is configured to, when the sound effect service process is not a system process of the system, set the sound effect service process to be a system process of the system.

According to a third aspect, the disclosure discloses a non-transitory storage medium, in which a program code may be stored. When the program code is run, a processor may execute the following operations.

A task manager is traversed to determine whether a sound effect service process for a sound effect service.

Responsive to determining that the sound effect service process exists, whether the sound effect service process is a system process of a system is determined.

When the sound effect service process is not a system process of the system, the sound effect service process is set to be a system process of the system.

BRIEF DESCRIPTION OF DRAWINGS

In order to describe the technical solutions in the embodiments of the disclosure more clearly, the drawings required to be used in descriptions about the embodiments will be simply introduced below. Obviously, the drawings in the following descriptions are only some embodiments of the disclosure. Those of ordinary skilled in the art may further obtain other drawings according to these drawings without creative work.

DETAILED DESCRIPTION

The embodiments of the disclosure provide a method and terminal for sound effect processing, which may ensure normal running of sound effect service in the terminal.

In order to make the solutions of the disclosure better understood by those skilled in the art, the technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Terms "first", "second" and the like in the specification, claims and drawings of the disclosure are adopted not to describe a specific sequence but to distinguish similar objects. In addition, terms "include" and "have" and any transformation thereof are intended to cover nonexclusive inclusions. For example, a process, method, system, product or equipment including a series of actions or units is not limited to the actions or units which are listed, but may optionally further include actions or units which are not listed or optionally further include other actions or units intrinsic to the process, the method, the product or the equipment.

An embodiment of the disclosure discloses a method for sound effect processing, which includes that: a task manager is traversed to determine whether a sound effect service process for a sound effect service; responsive to determining that the sound effect service process exists, whether the sound effect service process is a system process of a system is determined; and when the sound effect service process is not a system process of the system, the sound effect service process is set to be a system process of the system.

Figure 1:
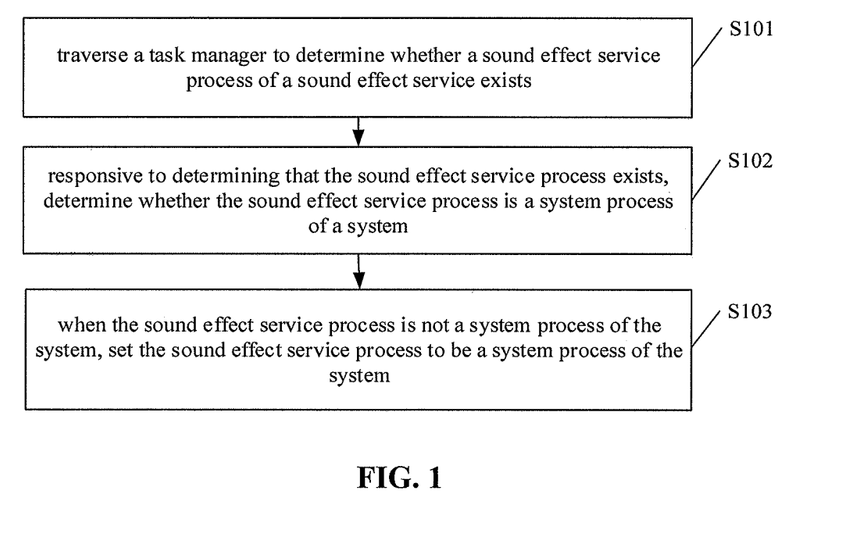
FIG. 1 illustrates a flowchart of a method for sound effect processing according to an embodiment of the disclosure.

Referring to FIG. 1, FIG. 1 illustrates a flowchart of a method for sound effect processing according to an embodiment of the disclosure, wherein, as illustrated in FIG. 1, the method for sound effect processing provided by the embodiment of the disclosure includes the following contents.

In S101, a task manager is traversed to determine whether a sound effect service process for a sound effect service exists.

It should be noted that an execution main body of the method is a terminal, and for example, may be electronic equipment with a music playing application like a smart phone, a tablet computer, intelligent wearable equipment and a computer.

The sound effect service process is configured to provide sound effect service.

A process is a running process of a program and is an independent unit for resource allocation and scheduling of a system.

It can be understood that a process is an execution of a program.

In S102, responsive to determining that the sound effect service process exists, whether the sound effect service process is a system process of a system is determined.

It can be understood that processes may be divided into different priorities and a process with a higher priority may obtain a resource more preferably, for example, a Central Processing Unit (CPU) resource, a memory resource and a hardware resource; or it can be understood that a process with a higher priority has a higher right.

It should be noted that a priority of a system process is very high. When the terminal is started, a system process may usually be created directly.

Furthermore, a system process has a high priority and a high right, and thus is quite unlikely to turn off by another application program; and even though another application program needs to use a resource of a certain system process, a user may be asked in advance whether to turn off a system process of the system to release the resource.

For example, when antivirus software kills viruses, a non-system process may be deeply analyzed, and even it may be prudent to directly terminate the non-system process.

According to an embodiment, responsive to determining that the sound effect service process does not exist, an automatic recovery mechanism is called to detect whether a running environment is abnormal; and when the running environment is normal, the sound effect service process is recovered, and a priority of the sound effect service process is improved.

For example, whether the running environment is abnormal may refer to whether a CPU is in a high-load state for a long time, whether a memory is in the high-load state for a long time or whether resource interlocking exists between processes.

According to an embodiment, responsive to determining that the sound effect service process does not exist, the sound effect service process is created to initiate sound effect service.

For example, whether the sound effect service process exists is detected at an interval of a preset time period, and if the sound effect service process does not exist, the sound effect service process is recreated to ensure that the sound effect service process always exists.

In addition, for ensuring continuity of the sound effect service, in a running state of the sound effect service process, a context of the running state may be stored at the interval of the preset time period for recovery according to the stored context or recreation according to the stored context when the sound effect service process is recovered.

It can be understood that the sound effect service process exists usually because music is played and playing of the music is usually accompanied with a sound effect.

Therefore, optionally, before the operation that the task manager is traversed to determine whether the sound effect service process exists, the method further includes that: whether a music player is running, is detected; responsive to detecting that the music player is running, whether a sound effect is abnormal is determined; and when the sound effect is abnormal, the task manager is traversed to determine whether the sound effect service process exists.

In 103, when the sound effect service process is not a system process of the system, the sound effect service process is set to be a system process of the system.

It should be noted that setting the sound effect service process to be a system process of the system may improve the priority of the sound effect service process and improve credibility of the sound effect service process, thereby reducing a probability in voluntary termination.

Furthermore, after the sound effect service process is set to be a system process of the system, the sound effect service is integrated into a system to automatically run the sound effect service process when the terminal is turned on next time.

It can be seen that, in the solution of the embodiment of the disclosure, the task manager is traversed to determine whether the sound effect service process exists; responsive to determining that the sound effect service process exists, whether the sound effect service process is a system process of the system is determined; and when the sound effect service process is not a system process of the system, the sound effect service process is set to be a system process of the system. In such a manner, by implementing the technical solutions provided by the disclosure, the sound effect service process is set to be a system process of the system, so that a right of the sound effect service process is improved, and normal running of the sound effect service in the terminal may further be ensured.

Figure 2:
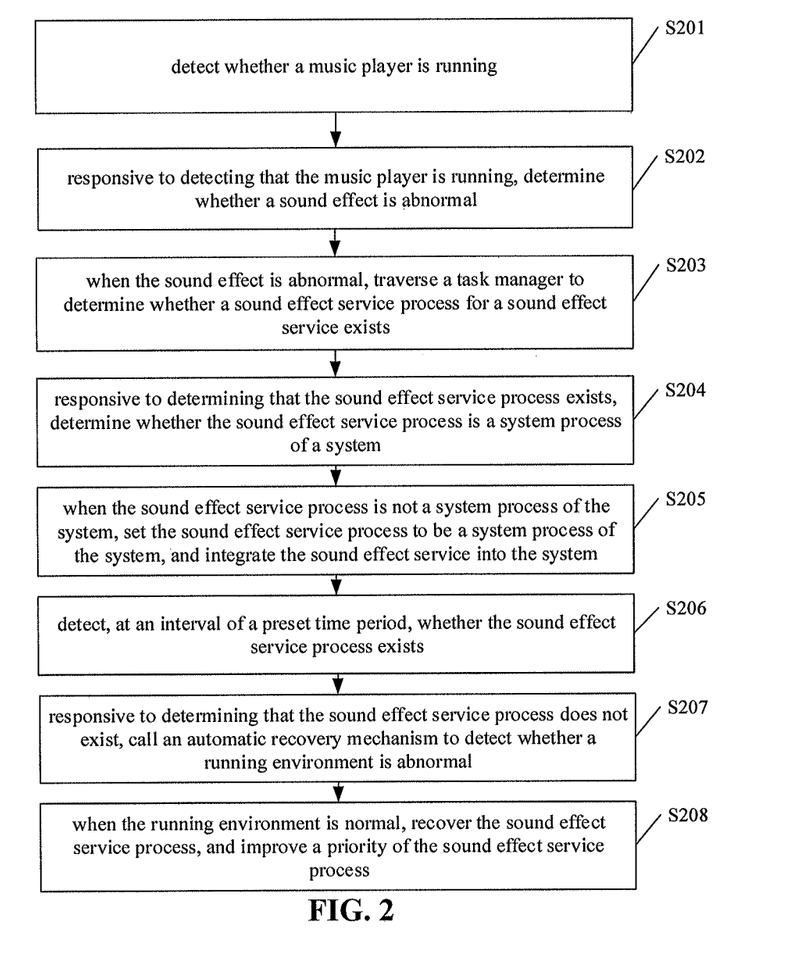
FIG. 2 illustrates a flowchart of another method for sound effect processing according to an embodiment of the disclosure.

Referring to FIG. 2, FIG. 2 is a flowchart of a method for sound effect processing according to another embodiment of the disclosure, where, as illustrated in FIG. 2, the other method for sound effect processing provided by the other embodiment of the disclosure may include the following contents.

In S201, whether a music player is running, is detected.

It should be noted that an execution main body of the method is a terminal, and for example, may be electronic equipment with a music playing application like a smart phone, a tablet computer, intelligent wearable equipment and a computer.

A sound effect service process is configured to provide a sound effect service.

A list of common music players may be stored in the terminal, and then an application program in a task manager is matched with the list to determine whether the music player is running.

Whether music is played may also be detected to determine whether a music player is running.

It should be noted that whether a video playing program runs may further be detected.

In S202, responsive to detecting that the music player is running, whether a sound effect is abnormal is determined.

For example, whether a sound effect abnormity exists.

In S203, when the sound effect is abnormal, a task manager is traversed to determine whether a sound effect service process exists.

In S204, responsive to determining that the sound effect service process exists, whether the sound effect service process is a system of a process is determined.

It can be understood that processes may be divided into different priorities and a process with a higher priority may obtain a resource more preferably, for example, a CPU resource, a memory resource and a hardware resource; or it can be understood that a process with a higher priority has a higher right.

It should be noted that a priority of a system process is very high. When the terminal is started, a system process may usually be created directly.

Furthermore, a system process has a high priority and a high right, and thus is quite unlikely to turn off by another application program; and even though another application program needs to use a resource of a certain system process, a user may be asked in advance whether to turn off a system process of the system to release the resource.

For example, when antivirus software kills viruses, a non-system process may be deeply analyzed, and even it may be prudent to directly terminate the non-system process.

In S205, when the sound effect service process is not a system process of the system, the sound effect service process is set to be a system process of the system, and sound effect service is integrated into a system.

For example, whether a running environment is abnormal may refer to whether a CPU is in a high-load state for a long time, whether a memory is in the high-load state for a long time or whether resource interlocking exists between processes.

Alternatively, responsive to determining that the sound effect service process does not exist, the sound effect service process is created to initiate the sound effect service.

For example, whether the sound effect service process exists is detected at an interval of a preset time period, and if the sound effect service process does not exist, the sound effect service process is recreated to ensure that the sound effect service process always exists.

In S206, whether the sound effect service process exists is detected at an interval of a preset time period.

It can be understood that, when whether the sound effect service process exists is detected, the task manager is mainly traversed to determine whether the sound effect service process exists.

In S207, responsive to determining that the sound effect service process does not exist, an automatic recovery mechanism is called to detect whether a running environment is abnormal.

In S208, when the running environment is normal, the sound effect service process is recovered, and a priority of the sound effect service process is improved.

For example, whether the sound effect service process exists is detected at the interval of the preset time period, and if the sound effect service process does not exist, the sound effect service process is recreated to ensure that the sound effect service process always exists.

It can be seen that, in the solution of the embodiment of the disclosure, the actions about how to create the sound effect service process when the sound effect service process does not exist are extended. In such a manner, by implementing the technical solution provided by the disclosure, continuous running of the sound effect service process may be ensured, thereby ensuring continuity of the sound effect service.

Figure 3:
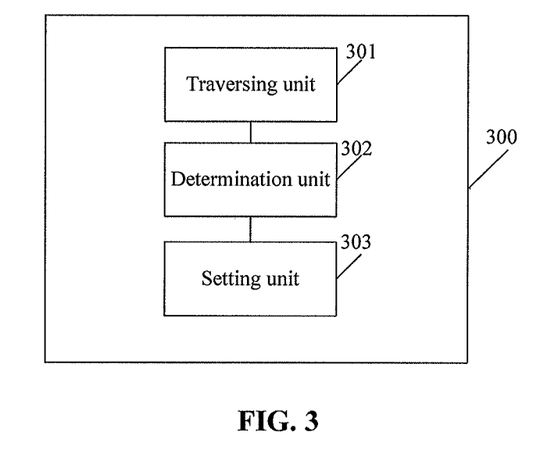
FIG. 3 illustrates a structure diagram of a device for sound effect processing according to an embodiment of the disclosure.

Referring to FIG. 3, FIG. 3 is a structure diagram of a device for sound effect processing according to an embodiment of the disclosure, where, as illustrated in FIG. 3, an embodiment of the disclosure provides a device 300, wherein the device for sound effect processing may be equipment such as a smart phone, a tablet computer and intelligent wearable equipment. The device 300 includes a traversing unit 301, a determination unit 302 and a setting unit 303.

The traversing unit 301 is configured to traverse a task manager to determine whether a sound effect service process for a sound effect service exists, The sound effect service process is configured to provide sound effect service.

The determination unit 302 is configured to, responsive to determining that the sound effect service process exists, determine whether the sound effect service process is a system process of a system.

It can be understood that processes may be divided into different priorities and a process with a higher priority may obtain a resource more preferably, for example, a CPU resource, a memory resource and a hardware resource; or it can be understood that a process with a higher priority has a higher right.

It should be noted that a priority of a system process is very high. When the terminal is started, a system process may usually be created directly.

Furthermore, a system process has a high priority and a high right, and thus is quite unlikely to turn off by another application program; and even though another application program needs to use a resource of a certain system process, a user may be asked in advance whether to turn off a system process of the system to release the resource.

For example, when antivirus software kills viruses, a non-system process may be deeply analyzed, and even it may be prudent to directly terminate the non-system process.

The setting unit 303 is configured to, when the sound effect service process is not a system process of the system, set the sound effect service process to be a system process of the system.

It should be noted that setting the sound effect service process to be a system process of the system may improve the priority of the sound effect service process and improve credibility of the sound effect service process, thereby reducing a probability in voluntary termination.

Furthermore, after the sound effect service process is set to be a system process of the system, the sound effect service is integrated into a system to automatically run the sound effect service process when the terminal is turned on next time.

The traversing unit 301, the determination unit 302 and the setting unit 303 may be configured to execute the method including Actions S101 to S103 in embodiment 1, and specific descriptions refer to the descriptions about the method in embodiment 1 and will not be made herein.

Figure 4:
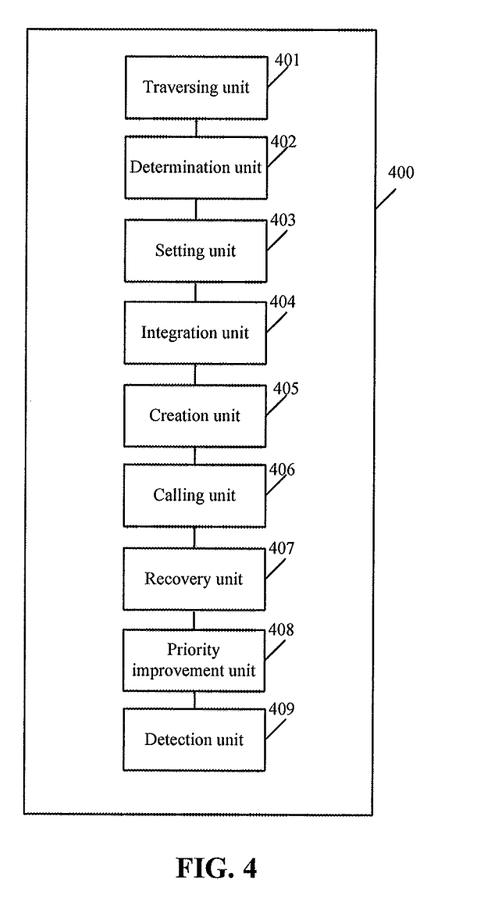
FIG. 4 illustrates a structure diagram of another device for sound effect processing according to an embodiment of the disclosure.

Referring to FIG. 4, FIG. 4 is a structure diagram of a terminal according to an embodiment of the disclosure, where, as illustrated in FIG. 4, an embodiment of the disclosure provides a terminal 400, wherein this device for sound effect processing may be equipment such as a smart phone, a tablet computer and intelligent wearable equipment. The device 400 for sound effect processing includes a traversing unit 401, a determination unit 402, a setting unit 403, an integration unit 404, a creation unit 405, a calling unit 406, a recovery unit 407, a priority improvement unit 408 and a detection unit 409.

The detection unit 409 is configured to detect whether a music player is running is detected.

A sound effect service process is configured to provide sound effect service.

A list of common music players may be stored in the device for sound effect processing, and then an application program in a task manager is matched with the list to determine whether the music player is running.

Whether music is played may also be detected to determine whether a music player is running.

It should be noted that whether a video playing program runs may further be detected.

The determination unit 402 is further configured to, responsive to detecting that the music player is running, determine whether a sound effect is abnormal.

For example, whether a sound effect abnormity exists.

The traversing unit 401 is configured to, when the sound effect is abnormal, traverse a task manager to determine whether a sound effect service process exists.

The determination unit 402 is configured to, responsive to determining that the sound effect service process exists, determine whether the sound effect service process is a system process of a system.

It can be understood that processes may be divided into different priorities and a process with a higher priority may obtain a resource more preferably, for example, a CPU resource, a memory resource and a hardware resource; or it can be understood that a process with a higher priority has a higher right.

It should be noted that a priority of a system process is very high. When the terminal is started, a system process may usually be created directly.

Furthermore, a system process has a high priority and a high right, and thus is quite unlikely to turn off by another application program; and even though another application program needs to use a resource of a certain system process, a user may be asked in advance whether to turn off a system process of the system to release the resource.

For example, when antivirus software kills viruses, a non-system process may be deeply analyzed, and even it may be prudent to directly terminate the non-system process.

The setting unit 403 is configured to, when the sound effect service process is not a system process of the system, set the sound effect service process to be a system process of the system.

The integration unit 404 is configured to integrate sound effect service into a system.

The traversing unit 401 is further configured to detect whether the sound effect service process exists at an interval of a preset time period.

The calling unit 406 is configured to, responsive to determining that the sound effect service process does not exist, call an automatic recovery mechanism to detect whether a running environment is abnormal.

For example, whether the running environment is abnormal may refer to whether a CPU is in a high-load state for a long time, whether a memory is in the high-load state for a long time or whether resource interlocking exists between processes.

Alternatively, the creation unit 405 is configured to, responsive to determining that the sound effect service process does not exist, create the sound effect service process to initiate the sound effect service.

The recovery unit 407 is configured to, when the running environment is normal, recover the sound effect service process.

For example, whether the sound effect service process exists is detected at an interval of a preset time period, and if the sound effect service process does not exist, the sound effect service process is recreated to ensure that the sound effect service process always exists.

The priority improvement unit 408 is configured to improve a priority of the sound effect service process.

The traversing unit 401, the determination unit 402, the setting unit 403, the integration unit 404, the creation unit 405, the calling unit 406, the recovery unit 407, the priority improvement unit 408 and the detection unit 409 may be configured to execute the method including Actions S201 to S207 in embodiment 2, and specific descriptions refer to the descriptions about the method in embodiment 2 and will not be made herein.

Figure 5:
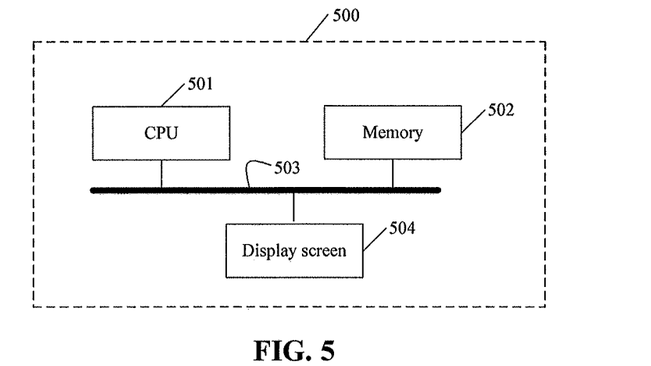
FIG. 5 illustrates a physical device structure diagram of a terminal according to an embodiment of the disclosure.

Referring to FIG. 5, another embodiment of the disclosure provides a terminal. The terminal 500 includes hardware such as a CPU 501, a memory 502, a bus 503 and a display screen 504, wherein the terminal 500 may be equipment such as a smart phone, a tablet computer and intelligent wearable equipment.

The CPU 501 executes a program pre-stored in the memory 502, an execution process specifically including that:

a task manager is traversed to determine whether a sound effect service process exists;

responsive to determining that the sound effect service process exists, whether the sound effect service process is a system process of a system is determined; and when the sound effect service process is not a system process of the system, the sound effect service process is set to be a system process of the system.

According to an embodiment, after the operation that the sound effect service process is set to be a system process of the system, the execution process further includes that: sound effect service is integrated into a system.

According to an embodiment, the execution process further includes that:

responsive to determining that the sound effect service process does not exist, the sound effect service process is created to initiate the sound effect service.

According to an embodiment, after the operation that the sound effect service process is set to be a system process of the system, the method further includes that:

whether the sound effect service process exists is detected at an interval of a preset time period;

responsive to determining that the sound effect service process does not exist, an automatic recovery mechanism is called to detect whether a running environment is abnormal; and when the running environment is normal, the sound effect service process is recovered, and a priority of the sound effect service process is improved.

According to an embodiment, before the operation that the task manager is traversed to determine whether the sound effect service process exists, the execution process further includes that:

whether a music player is running is detected;

responsive to detecting that the music player is running, whether a sound effect is abnormal is determined; and when the sound effect is abnormal, the task manager is traversed to determine whether the sound effect service process exists.

It can be seen that, in the solution of the embodiment of the disclosure, the task manager is traversed to determine whether the sound effect service process exists; responsive to determining that the sound effect service process exists, whether the sound effect service process is a system process of the system is determined; and when the sound effect service process is not a system process of the system, the sound effect service process is set to be a system process of the system. In such a manner, by implementing the technical solutions provided by the disclosure, the sound effect service process is set to be a system process of the system, so that a right of the sound effect service process is improved, and normal running of the sound effect service in the terminal may further be ensured.

Figure 6:
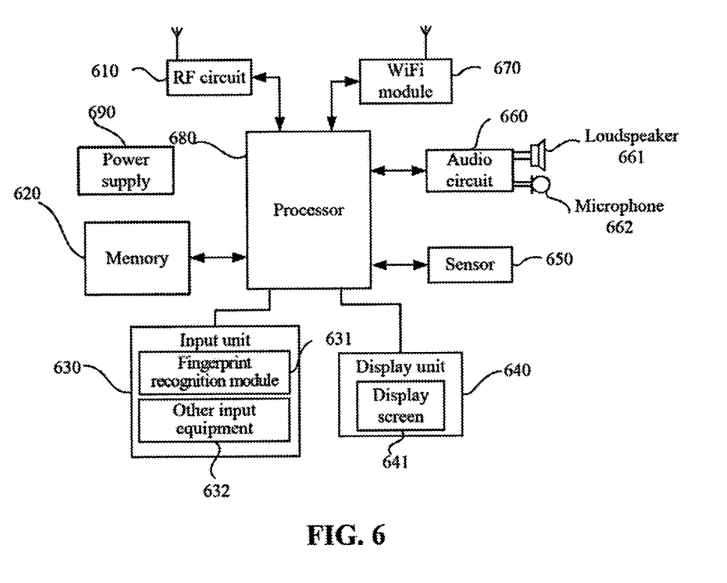
FIG. 6 illustrates a physical device structure diagram of a mobile phone according to an embodiment of the disclosure.

Referring to FIG. 6, FIG. 6 is a block diagram of part of a structure of a mobile phone related to a terminal according to an embodiment of the disclosure. Referring to FIG. 6, the mobile phone includes components such as a Radio Frequency (RF) circuit 610, a memory 620, an input unit 630, a display unit 640, a sensor 650, an audio circuit 660, a Wireless Fidelity (WiFi) module 670, a processor 680 and a power supply 690. Those skilled in the art should know that the structure of the mobile phone illustrated in FIG. 6 is not intended to limit the mobile phone and may include components more or fewer than those illustrated in the figure or some components are combined or different component arrangements are adopted.

Each component of the mobile phone will be specifically introduced below in combination with FIG. 6.

The RF circuit 610 may be configured to receive and send information. The RF circuit 610 usually includes, but not limited to, an antenna, at least one amplifier, a transceiver, a coupler, an LNA, a duplexer and the like. In addition, the RF circuit 610 may also communicate with a network and other equipment in a wireless communication manner. Any communication standard or protocol may be used for wireless communication, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an electronic mail, Short Messaging Service (SMS) and the like.

The memory 620 may be configured to store a software program and a module, and the processor 680 operates the software program and module stored in the memory 620, thereby executing various function applications and data processing of the mobile phone. The memory 620 may mainly include a program storage region and a data storage region, wherein the program storage region may store an operating system, an application program required by at least one function (for example, a music playing function, a sound effect service process detection function and a sound effect service process setting function) and the like, and the data storage region may store data (for example, a system service process and a sound effect service process) created according to use of the mobile phone and the like. In addition, the memory 620 may include a high-speed RAM, and may further include a non-volatile memory, for example, at least one disk storage device, flash memory device or other volatile solid-state storage device.

The input unit 630 may be configured to receive input digital or character information and generate key signal input related to user setting and function control of the mobile phone. Specifically, the input unit 630 may include a fingerprint recognition module 631 and other input equipment 632. The fingerprint recognition module 631 may collect fingerprint data of a user thereon. According to an embodiment, the fingerprint recognition module 631 may include an optical fingerprint module, a capacitive fingerprint module and an RF fingerprint module. For example, the fingerprint recognition module 631 is a capacitive fingerprint recognition module including a sensing electrode (n1 abnormity sensing electrode and n2 normality sensing electrode) and a signal processing circuit (for example, an amplification circuit, a noise suppression circuit and an analogue-to-digital conversion circuit) connected with the sensing electrode. Besides the fingerprint recognition module 631, the input unit 630 may further include the other input equipment 632. Specifically, the other input equipment 632 may include, but not limited to, one or more of a physical keyboard, a function key (for example, a volume control key and an on-off key), a trackball, a mouse, a joystick and the like.

The display unit 640 may be configured to display information input by the user or information provided for the user and various menus of the mobile phone. The display unit 640 may include a display screen 641. According to an embodiment, the display screen 641 may be configured in form of a Liquid Crystal Display (LCD), an Organic Light-Emitting Diode (OLED) and the like. Although the fingerprint recognition module 631 and display screen 641 in FIG. 6 realize input and output functions of the mobile phone as two independent components, the fingerprint recognition module 631 and the display screen 641 may be integrated to realize the input and output functions of the mobile phone in some embodiments.

The mobile phone may further include at least one sensor 650, for example, a light sensor, a motion sensor and another sensor. Specifically, the light sensor may include an environmental light sensor and a proximity sensor, wherein the environmental light sensor may regulate brightness of the display screen 641 according to brightness of environmental light, and the proximity sensor may turn off the display screen 641 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the mobile phone will not be elaborated herein.

The audio circuit 660, a loudspeaker 661 and a microphone 662 may provide an audio interface between the user and the mobile phone. The audio circuit 660 may transmit an electric signal converted from received audio data to the loudspeaker 661, and then the loudspeaker 661 converts it into a sound signal for output. On the other aspect, the microphone 662 converts a collected sound signal into an electric signal, and then the audio circuit 660 receives and converts it into audio data and outputs the audio data to the processor 680 for processing and sending to, for example, another mobile phone through the RF circuit 610 or outputs the audio data to the memory 620 for further processing.

WiFi is a short-distance wireless communication technology. The mobile phone may help the user to receive and send an electronic mail, browse a webpage, access streaming media and the like through the WiFi module 670, and provides wireless broadband Internet access for the user. Although the WiFi module 670 is illustrated in FIG. 6, it can be understood that it is not a necessary component of the mobile phone and may completely be omitted according to a requirement without changing the scope of the essence of the disclosure.

The processor 680 is a control center of the mobile phone, connects each part of the whole mobile phone by virtue of various interfaces and lines and executes various functions and data processing of the mobile phone by operating or executing the software program and/or module stored in the memory 620 and calling data stored in the memory 620, thereby monitoring the whole mobile phone. According to an embodiment, the processor 680 may include one or more processing units. Preferably, the processor 680 may integrate an application processor and a modulation and demodulation processor, wherein the application processor mainly processes the operating system, a user interface, an application program and the like, and the modulation and demodulation processor mainly processes wireless communication. It can be understood that the modulation and demodulation processor may also not be integrated into the processor 680.

The mobile phone further includes the power supply 690 (for example, a battery) supplying power to each component. Preferably, the power supply may be logically connected with the processor 680 through a power management system, thereby realizing functions of charging and discharging management, power consumption management and the like through the power management system.

Although not illustrated in the figure, the mobile phone may further include a camera, a Bluetooth module and the like, which will not be elaborated herein.

In the embodiments illustrated in FIG. 1 and FIG. 2, each step of the method flows may be implemented on the basis of the structure of the mobile phone.

In the embodiments illustrated in FIG. 3 and FIG. 4, the function of each unit may be realized on the basis of the structure of the mobile phone.

Each embodiment in the abovementioned embodiments is described with different emphases, and undetailed parts in a certain embodiment may refer to related descriptions in the other embodiments.

In some embodiments provided by the application, it should be understood that the disclosed device may be implemented in another manner. For example, the device embodiment described above is only schematic, and for example, division of the units is only logical function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable memory. Based on such an understanding, the technical solutions of the disclosure substantially or parts making contributions to the conventional art or all or part of the technical solutions may be embodied in form of software product, and the computer software product is stored in a memory, including a plurality of instructions configured to enable a piece of computer equipment (which may be a personal computer, a server, network equipment or the like) to execute all or part of the actions of the method in each embodiment of the disclosure. The memory includes: various media capable of storing program codes such as a U disk, a Read-Only Memory (ROM), a RAM, a mobile hard disk, a magnetic disk or an optical disk.

As mentioned above, the above embodiments are adopted not to limit but only to describe the technical solutions of the disclosure. Although the disclosure has been described in detail according to the embodiments, those of ordinary skilled in the art should know that modifications may still be made to the technical solutions recorded in each embodiment or equivalent replacements may be made to part of technical characteristics therein and these modifications or equivalent replacements do not make the essence of the corresponding technical solutions depart from the scope of the technical solution of each embodiment of the disclosure.

The invention claimed is:

1. A method for sound effect processing, comprising:
traversing a task manager to determine whether a sound effect service process for a sound effect service exists;
responsive to determining that the sound effect service process exists, determining whether the sound effect service process is a system process of a system, wherein a priority of the system process of the system is high, and when a terminal is started, the system process of the system is created directly, wherein the priority indicates a degree of right to obtain a resource of the system and a process with a higher priority can obtain the resource more preferably;
when the sound effect service process is not a system process of the system, setting the sound effect service process to be a system process of the system;
detecting, at an interval of a preset time period, whether the sound effect service process exists;
responsive to determining that the sound effect service process does not exist, calling an automatic recovery mechanism to detect whether a running environment is abnormal, and
when the running environment is normal, recovering the sound effect service process, and improving a priority of the sound effect service process.

2. The method according to claim 1, wherein after setting the sound effect service process to be a system process of the system, the method further comprises:
integrating the sound effect service into the system.

3. The method according to claim 1, further comprising:
responsive to determining that the sound effect service process does not exist, creating the sound effect service process to initiate the sound effect service.

4. The method according to claim 1, wherein before traversing the task manager to determine whether the sound effect service process exists, the method further comprises:

detecting whether a music player is running;
responsive to detecting that the music player is running, determining whether a sound effect is abnormal; and
when the sound effect is abnormal, traversing the task manager to determine whether the sound effect service process exists.

5. A terminal, comprising:
a memory storing an executable program code; and
a processor coupled to the memory, wherein
the processor calls the executable program code stored in the memory to execute a method, comprising:
traversing a task manager to determine whether a sound effect service process for a sound effect service exists;
responsive to determining that the sound effect service process exists, determining whether the sound effect service process is a system process of a system, wherein a priority of the system process of the system is high, and when the terminal is started, the system process of the system is created directly, wherein the priority indicates a degree of right to obtain a resource of the system and a process with a higher priority can obtain the resource more preferably;
when the sound effect service process is not a system process of the system, setting the sound effect service process to be a system process of the system;
detecting, at an interval of a preset time period, whether the sound effect service process exists;
responsive to determining that the sound effect service process does not exist, calling an automatic recovery mechanism to detect whether a running environment is abnormal, and
when the running environment is normal, recovering the sound effect service process, and improving a priority of the sound effect service process.

6. The terminal according to claim 5, wherein after setting the sound effect service process to be a system process of the system, the method further comprises:
integrating the sound effect service into the system.

7. The terminal according to claim 5, wherein the method further comprises:
responsive to determining that the sound effect service process does not exist, creating the sound effect service process to initiate the sound effect service.

8. The terminal according to claim 5, wherein before traversing the task manager to determine whether the sound effect service process exists, the method further comprises:
detecting whether a music player is running;
responsive to detecting that the music player is running, determining whether a sound effect is abnormal; and
when the sound effect is abnormal, traversing the task manager to determine whether the sound effect service process exists.

9. The method according to claim 1, wherein improving a priority of the sound effect service process comprises:
improving a priority of the sound effect service process to be same as the priority of the system process of the system.

10. The method according to claim 1, wherein whether the running environment is abnormal indicates whether a CPU is in a high-load state for a long time, whether a memory is in the high-load state for a long time or whether resource interlocking exists between processes.

11. The terminal according to claim 5, wherein improving a priority of the sound effect service process comprises:
improving a priority of the sound effect service process to be same as the priority of the system process of the system.

12. The terminal according to claim 5, wherein whether the running environment is abnormal indicates whether a CPU is in a high-load state for a long time, whether a memory is in the high-load state for a long time or whether resource interlocking exists between processes.

13. A non-transitory storage medium, in which a program code is stored, wherein, when the program code is run, a processor may execute the following operations:
traversing a task manager to determine whether a sound effect service process for a sound effect service exists;
responsive to determining that the sound effect service process exists, determining whether the sound effect service process is a system process of a system, wherein a priority of the system process of the system is high, and when a terminal is started, the system process of the system is created directly, wherein the priority indicates a degree of right to obtain a resource of the system and a process with a higher priority can obtain the resource more preferably;
when the sound effect service process is not a system process of the system, setting the sound effect service process to be a system process of the system;
detecting, at an interval of a preset time period, whether the sound effect service process exists;
responsive to determining that the sound effect service process does not exist, calling an automatic recovery mechanism to detect whether a running environment is abnormal, and
when the running environment is normal, recovering the sound effect service process, and improving a priority of the sound effect service process.

14. The medium according to claim 13, wherein, after setting the sound effect service process to be a system process of the system, the operations further comprise:
integrating the sound effect service into the system.

15. The medium according to claim 13, wherein the operations further comprise:
responsive to determining that the sound effect service process does not exist, creating the sound effect service process to initiate the sound effect service.

16. The medium according to claim 13, wherein, before traversing the task manager to determine whether the sound effect service process exists, the operations further comprise:
detecting whether a music player is running;
responsive to detecting that the music player is running, determining whether a sound effect is abnormal; and
when the sound effect is abnormal, traversing the task manager to determine whether the sound effect service process exists.

17. The medium according to claim 13, wherein improving a priority of the sound effect service process comprises:
improving a priority of the sound effect service process to be same as the priority of the system process of the system.

18. The medium according to claim 13, wherein whether the running environment is abnormal indicates whether a CPU is in a high-load state for a long time, whether a memory is in the high-load state for a long time or whether resource interlocking exists between processes.

* * * * *